(12) United States Patent
Yamashita et al.

(10) Patent No.: US 6,725,649 B2
(45) Date of Patent: Apr. 27, 2004

(54) CONTROL APPARATUS FOR A DIRECT-INJECTION, SPARK-IGNITION ENGINE

(75) Inventors: Hiroyuki Yamashita, Hiroshima (JP);
Masashi Marubara, Hiroshima (JP);
Hiroyuki Yoshida, Hiroshima (JP);
Noriyuki Ohta, Hiroshima (JP)

(73) Assignee: Mazda Motor Corporation (JP)

( * ) Notice: Subject to any disclaimer, the term of this patent is extended or adjusted under 35 U.S.C. 154(b) by 0 days.

(21) Appl. No.: 10/235,951

(22) Filed: Sep. 6, 2002

(65) Prior Publication Data

US 2003/0074890 A1 Apr. 24, 2003

(30) Foreign Application Priority Data

Sep. 6, 2001 (JP) ........................... 2001-270809

(51) Int. Cl.$^7$ ................................. F01N 3/00
(52) U.S. Cl. ..................... 60/284; 60/285; 60/286; 60/295; 123/295; 123/430; 123/431
(58) Field of Search .................. 60/274, 285, 286, 60/295, 284, 299; 123/299, 300, 430, 431, 295

(56) References Cited

U.S. PATENT DOCUMENTS

| 6,044,642 A | 4/2000 | Nishimura et al. |
| 6,240,724 B1 | 6/2001 | Kudou et al. |
| 6,449,946 B2 * | 9/2002 | Kuji et al. ................ 60/286 |
| 6,560,960 B2 * | 5/2003 | Nishimura et al. ........ 60/284 |
| 6,574,961 B2 * | 6/2003 | Shiraishi et al. .......... 60/602 |

FOREIGN PATENT DOCUMENTS

| DE | 19962293 | 6/2001 |
| EP | 0 856 655 A2 | 8/1998 |
| EP | 0 928 887 A2 | 12/1998 |
| EP | 0 978 643 A3 | 2/2000 |
| EP | 0982489 A2 | 3/2000 |

OTHER PUBLICATIONS

Japanese Patent Publication 2000-054881, w/English abstract only.
Japanese Patent Publication H11-141338, w/English abstract only.
Japanese Patent Publication H10-212987.
Japanese Patent Publication 2000-54882.
Japanese Patent Publication H11-200866.

* cited by examiner

*Primary Examiner*—Binh Tran
(74) *Attorney, Agent, or Firm*—Nixon Peabody LLP; Donald R. Studebaker

(57) ABSTRACT

A control apparatus for a direct-injection, spark-ignition engine including a temperature-condition detector for detecting a temperature condition of the engine catalyst, and a controller for controlling a fuel-injection operation. The controller controls the fuel injector to perform divided fuel injections of at least a leading fuel injection and a trailing fuel injection during a compression stroke prior to the ignition timing based upon a detection of the temperature condition in an inactivated state of the catalyst, the trailing fuel injection being performed at such a timing that its mixture concentrates adjacent to the spark plug at the ignition timing by way of high cylinder pressure during a late-stage of the compression stroke, the leading fuel injection being performed at such a timing that its mixture distributes around a mixture layer by the trailing fuel injection at the ignition timing, and a midpoint between an initiation of the leading fuel injection and an initiation of the trailing fuel injection being positioned within a period during a latter half of a compression stroke.

5 Claims, 10 Drawing Sheets

0.1MPa

Atmosphere pressure 0.25MPa approximately at BTDC 60°

0.4MPa approximately at BTDC 40°

CONTROL APPARATUS FOR A DIRECT-INJECTION, SPARK-IGNITION ENGINE

BACKGROUND OF THE INVENTION

1. Field of the Invention

The present invention relates to a control apparatus for an engine, and more particularly, to a control apparatus for a direct-injection, spark-ignition engine equipped with a catalyst in its exhaust-gas passage, a tumble generating section, and a fuel injector for directly injecting fuel into a combustion chamber so as to stratify combustible mixture in the proximity of a spark plug by way of the tumble flow during a stratified-combustion operation.

2. Description of the Related Art

Conventionally, direct-injection, spark-ignition engines have been well known. Typically, such engines are provided with a fuel injector which directly injects fuel into a combustion chamber, wherein an air/fuel ratio is set to be lean and the fuel injector injects fuel during a compression stroke so as to concentrate mixture in the proximity of the spark plug for providing the stratified-combustion operation in an operational region of low engine rotational speed and low load, thereby improving fuel efficiency.

In the meantime, generally, an automotive engine is equipped with a catalyst in its exhaust-gas passage for purifying exhaust-gas. Because the catalyst provides insufficient purification in an inactivated state where its temperature is lower than its activation temperature, the catalyst desirably promotes its warm-up (referred to as light-off) to activate as quickly as possible for better emission performance.

By way of example of an approach to promoting light-off of the catalyst for the direct-injection spark-ignition engine described above, Japanese Patent Publication No. 2000-54881 discloses controlling the fuel injector to perform a divided fuel injection of a plurality of fuel injections during the inactivated state of the catalyst. That is, in the engine disclosed in the patent publication above, the divided injection performed during a compression stroke in the inactivated state of the catalyst produces a mixture layer richer in an air/fuel ratio in the proximity of the spark plug and a mixture layer leaner in an air/fuel ratio around the richer layer at an ignition timing. Ignition under such mixture distribution raises the exhaust-gas temperature to promote light-off of the catalyst, as will be described later.

Meanwhile, an embodiment illustrated in drawing figures of the patent publication above discloses a cavity constituted of a deep recess formed at a portion of top surface approximate to the fuel injector, for guiding fuel injected by the fuel injector. Fuel is injected towards the cavity, so that fuel spray collides against inner surfaces of the cavity and is directed towards the spark plug.

Some types of the aforementioned engines perform a divided injection of an intake-stroke injection and a compression-stroke injection in the inactivated state of the catalyst. In these engines, as well as the one described above, the compression-stroke injection produces a richer mixture-layer in the proximity of the spark plug and a leaner mixture-layer outside of the richer layer (or the area up to a peripheral wall of the combustion chamber), so as to raise the exhaust-gas temperature for promoting light-off of the catalyst.

Moreover, Japanese Patent Publication No. H11-141338 proposes an approach to effectively stratifying mixture in the proximity of the spark plug, other than guiding the fuel spray by way of the wall surface of the cavity described above in the direct-injection spark-ignition engine. The approach is to configure an intake port so as to generate a tumble flow in the combustion chamber, and to cause the fuel injector to inject fuel in the opposite direction to the tumble flow during the late-stage of the compression stroke in the stratified-combustion mode, so that the fuel sprayed by the fuel injector is redirected by the tumble flow and transferred to the proximity of the spark plug.

The divided injections during the compression stroke or the divided injections during the intake stroke and the compression stroke produce a relatively richer mixture-layer in the proximity of the spark plug and a relatively leaner mixture-layer around the richer mixture as described above. This can prolong the combustion because the relative richer mixture-layer in the proximity of the spark plug combusts immediately after the ignition, the flame is propagated to the leaner mixture-layer thereafter, and then the leaner mixture-layer slowly combusts. Additionally, excessive air and the remaining fuel are mixed in the proximity of the spark plug to further combust. As a result, the combustion continues until a late timing.

The delayed combustion-completion raises the exhaust-gas temperature. However, for an additional temperature increase in the exhaust-gas to promote light-off of the catalyst, the ignition timing is desirably retarded in connection with the retard of the fuel injection timing while maintaining the sufficient combustibility to prevent the deterioration in emission performance and fuel efficiency. Japanese Patent Publication No. H11-141338 refers to no particular control in the inactivated state of the catalyst.

SUMMARY OF THE INVENTION

In view of the aspect above, an object of the present invention is to provide a control apparatus for a direct-injection, spark-ignition engine, which further promotes light-off of the catalyst than the conventional apparatus while avoiding the deterioration in emission performance and fuel efficiency in the inactivated state of the catalyst.

In accordance with the present invention, the object is achieved by providing a control apparatus for a direct-injection, spark-ignition engine including a tumble generating device for generating a tumble flow in a combustion chamber, a fuel injector which injects fuel in the direction opposite to the tumble flow into the combustion chamber so as to generate a combustible mixture adjacent to a spark plug at an ignition timing in association with the ignition timing in a predetermined operational region of low engine rotational-speed and low load, and a catalyst disposed in an exhaust-gas passage, the control apparatus including a temperature-condition detection device for detecting a temperature condition of the catalyst, and a control device for controlling a fuel-injection operation of the fuel injector. In accordance with the present invention, the control device controls the fuel injector to perform divided fuel injections of at least a leading fuel injection and a trailing fuel injection during a compression stroke prior to an ignition timing based upon the determination of the temperature condition by the temperature-condition detection device in an inactivated state of the catalyst. Moreover, the trailing fuel injection is performed at such a timing that its mixture concentrates in the proximity of the spark plug at the ignition timing by way of high cylinder pressure during the late-stage of the compression stroke, the leading fuel injection is performed at such a timing that its mixture distributes around the mixture layer by the trailing fuel injection at the ignition timing, and the midpoint between an initiation timing of the leading fuel injection and an initiation timing of the trailing fuel injection is positioned within a period during the latter half of the compression stroke.

Accordingly, at the ignition timing, a mixture distribution, in which relatively richer mixture-layer of fuel spray by the trailing fuel injection concentrates in the proximity of the spark plug and a relatively leaner mixture-layer of fuel spray by the leading fuel injection distributes around the richer layer, is attained. Under such a mixture distribution, the relative richer mixture-layer in the proximity of the spark plug combusts firstly, the flame is propagated to the leaner mixture-layer thereafter, and then the leaner mixture-layer slowly combusts. Subsequently, excessive air and the remaining fuel are mixed adjacent to the spark plug to combust. Therefore, an overall combustion period is prolonged, or the combustion completion timing is delayed, so as to effectively raise the exhaust-gas temperature. That is, in a direct-injection, spark-ignition engine that achieves the stratified mixture distribution by the confronting of a tumble flow and intake air, an adequate mixture distribution for promoting the temperature rise in the exhaust gas is reliably provided. Particularly, the trailing fuel injection is performed in the late-stage of the compression stroke during which the cylinder pressure is relatively higher, so that the fuel spray by the trailing injection remains adjacent to the spark plug. On the other hand, the leading fuel injection is retarded and performed during the term when the tumble flow is relatively stronger, so that the fuel spray by the leading fuel injection confronts against the tumble flow to be quickly atomized and distributed around the spark plug. As a result, at the ignition timing, the mixture of the fuel spray by the leading injection distributes over a certain area around the spark plug and a richer mixture-layer enriched by the fuel spray of the trailing injection concentrates in the proximity of the spark plug, in the direct-injection spark-ignition engine that guides the fuel spray with the tumble flow generated in the combustion chamber.

Additionally, the initiation timing of the leading fuel injection and the initiation timing of the trailing fuel injection are delayed so that the midpoint between the initiation timing of the leading fuel injection and the initiation timing of the trailing fuel injection is positioned within the latter half of the compression stroke. Especially, the trailing fuel injection timing is delayed to a period close to the top dead center of the compression stroke so that its fuel spray concentrates in the proximity of the spark plug at the ignition timing by way of high pressure during the late-stage of the compression stroke, and the ignition timing is retarded in connection with the delay of the injection timing. The retarded ignition timing and the delayed injection timing in the aforementioned manner effectively raise the exhaust-gas temperature.

Moreover, in accordance with the present invention, the fuel injector injects fuel in the direction opposite to the tumble flow, so that less fuel deposits on the wall surface causes preferable combustion, which provides less smoke production and less HC emission, even if the injection timing is delayed. This improves emission performance and fuel efficiency. In contrast, in accordance with the conventional apparatus provided with a deep cavity on the top surface of its piston for guiding fuel spray by way of the wall surface of the cavity, the amount of fuel deposit increases as the fuel injection timing is delayed, which is likely to deteriorate combustibility and increase smoke production.

Preferably, in the apparatus set forth in the present invention, the leading fuel injection may be performed at such a timing that its fuel spray confronts against the tumble flow to concentrate adjacent to the spark plug. This provides a mixture distribution in which a relatively leaner-mixture, which is fully atomized after colliding against the tumble flow, distributes around the relatively richer mixture-layer by fuel spray of the trailing fuel injection, ensuring the combustion stability.

More preferably, the amount of the leading fuel injection may be larger than that of the trailing fuel injection. That is, the trailing fuel injection, whose fuel spray is difficult to atomize, is in a relatively smaller amount, on the other hand, the leading fuel injection, whose fuel spray is easy to atomize, is in a relatively larger amount, which is advantageous to smoke reduction.

Further, it is preferred that the fuel injector be controlled so as to perform the leading fuel injection and the trailing fuel injection during the late-stage of the compression stroke prior to an ignition timing in the inactivated state of the catalyst, at least in a condition of low engine rotational-speed and low load. Still further, it is preferred that both the timings of the leading fuel injection and the trailing fuel injection be set so that the midpoint between a completion timing of the leading fuel injection and an initiation timing of the trailing fuel injection is positioned within a period past two thirds of the compression stroke.

According to the constitutions above, retarding timings of the leading fuel injection and delaying the trailing fuel injection as possible within the range where the preferable combustibility is maintained in the aforementioned manner further raises the exhaust-gas temperature in combination with the ignition timing greatly retarded.

These and other objects, features, aspects, and advantages of the present invention will become more apparent from the following detailed description of the preferred embodiment relative to the accompanied drawings.

DETAILED DESCRIPTION OF THE INVENTION

Figure 1:
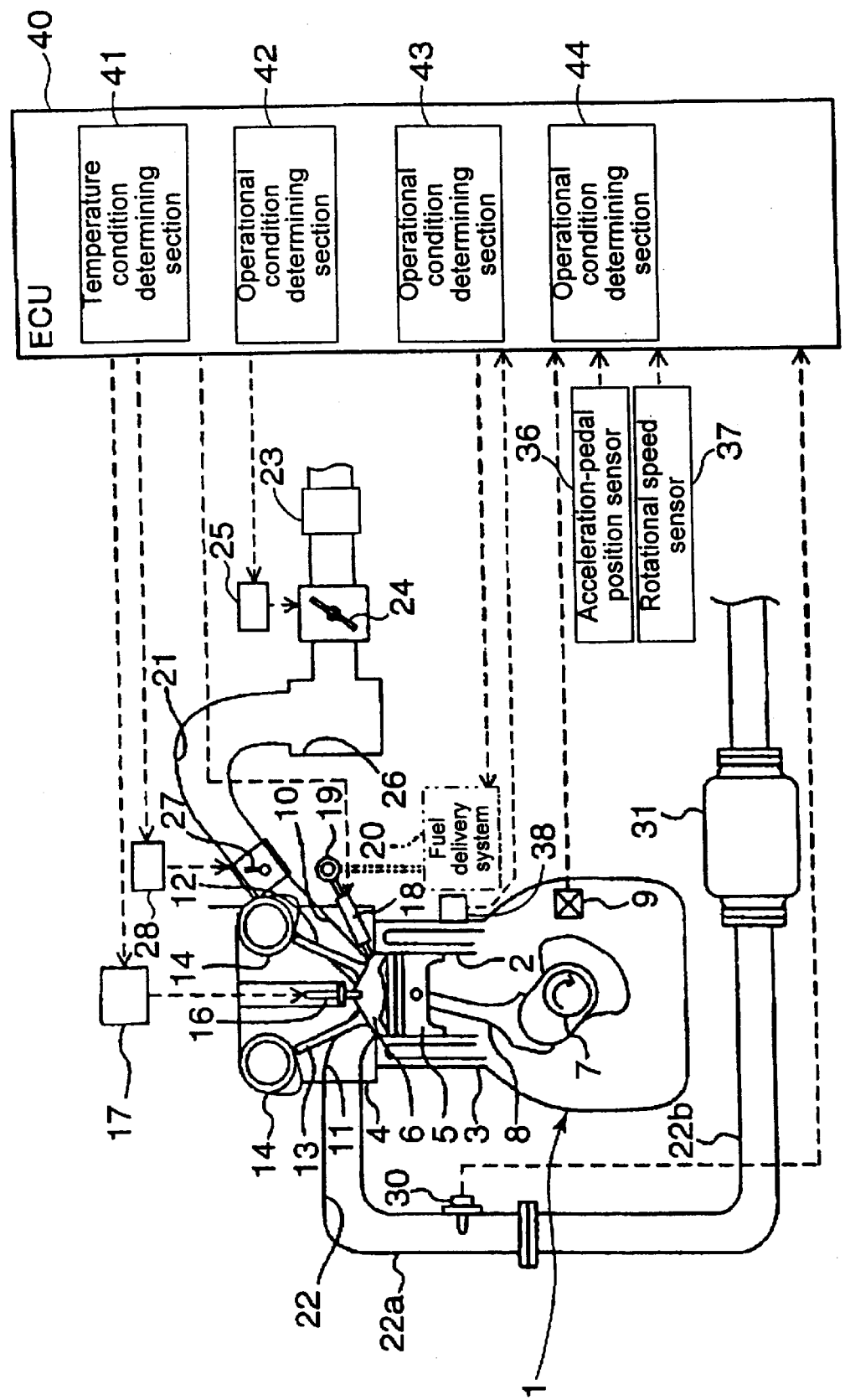
FIG. 1 is a schematic diagram illustrating an overall structure of an engine incorporating a control apparatus in accordance with the present invention.

FIG. 1 illustrates an overall configuration of a direct-injection spark-ignition engine in accordance with the preferred embodiment of the present invention.

As illustrated in the drawing, a main body of the engine 1 includes a cylinder block 3 formed with a plurality of cylinders 2, a cylinder head 4 mounted on the cylinder block 3, a piston 5 fitted within each cylinder 2 so as to reciprocate in a vertical direction. The piston 5 is connected to a crankshaft 7 which is rotatably supported at the lower portion of the cylinder block 3 via a connecting rod 8. At an end of the crankshaft 7, an electromagnetic crank-angle sensor 9 is provided for detecting a crank angle (or a rotation angle of the crankshaft). A combustion chamber 6 is defined between the piston 5 and the cylinder head 4.

The combustion chamber 6 of each cylinder 2 is of a so-called bent-roof type, the roof of which includes two slant faces that each extend from the central portion of the roof to the lower surface of the cylinder head 4. A pair of intake ports 10 and a pair of exhaust ports 11 open on the two slant surfaces of the roof of the combustion chamber 6, respectively (one of the ports 10 and one of the ports 11 are illustrated in the drawings). An intake valve 12 and an exhaust valve 13 are disposed at the opening edge of the respective ports 10 and 11, the intake valve 12 and the exhaust valve 13 opening and closing at a predetermined timing for corresponding cylinders. The intake valve 12 and the exhaust valve 13 are driven by a valve-driving mechanism including a pair of camshafts 14 rotatably supported at the upper portion of the cylinder head 4.

At the central top portion of the combustion chamber 6, a spark plug 16 is fitted so as to be surrounded by the four valves, a tip end of the spark plug 16 projecting into the combustion chamber 6. The spark plug 16 is electrically connected to an ignition circuit 17 which energizes the spark plug 16 at a predetermined timing for corresponding cylinders.

On a peripheral wall of the cylinder 6, a fuel injector 18 is disposed between the two intake ports 10, the fuel injector 18 injecting fuel into the combustion chamber 6. The proximal end of the fuel injector 18 is connected to a fuel distribution pipe 19 which distributes high-pressure fuel delivered from a fuel delivery system 20 for each cylinder.

Figure 2:
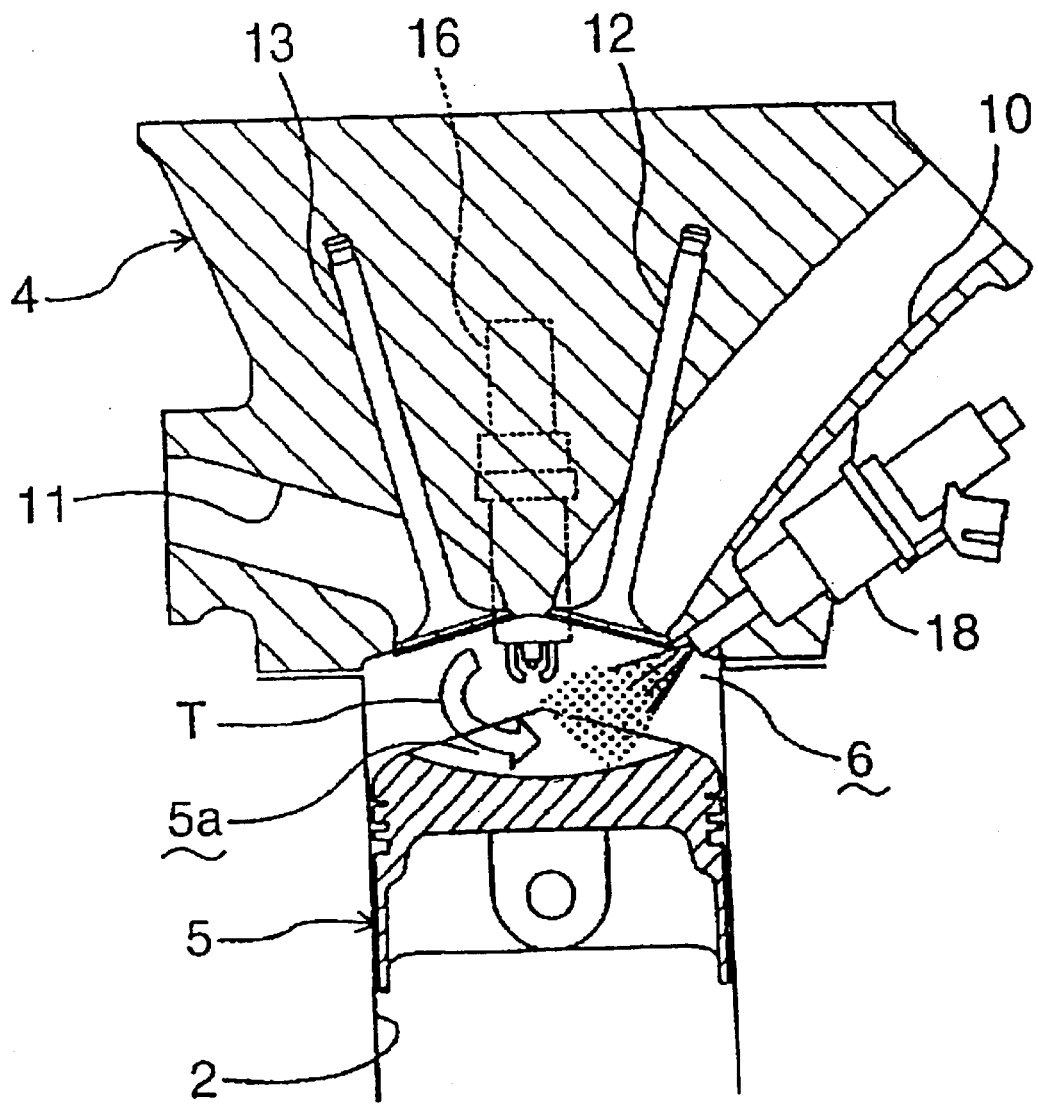
FIG. 2 is a cross-sectional view of the main body of the engine.

The structure of the main body of the engine 1 will now be described in further detail with reference to an enlarged cross-sectional view illustrated in FIG. 2. The intake port 10 extends straight and diagonally from the combustion chamber 6 and opens on one side surface of the main body of the engine 1 (on the right-side surface thereof in FIG. 2). Two intake ports 10 (one of which is illustrated) are individually provided for a cylinder. The intake ports 10 are parts of a tumble generating mechanism which causes intake air introduced into the combustion chamber 6 through the intake port 10 to behave as a tumble flow T in the combustion chamber 6. As illustrated in FIG. 2, the tumble flow T turns counterclockwise (or in the direction indicated by an arrow in FIG. 2) in the cross-sectional view which depicts the intake port 10 on the right side and the exhaust port 11 on the left side of the combustion chamber 6.

The fuel injector 18 injects fuel in the direction opposite to the tumble flow T. Specifically, in the cross sectional view as illustrated in FIG. 2, the fuel injector 18, disposed on the right side in the combustion chamber 6, injects fuel in the leftward and downward direction, so that the injected fuel is directed against the tumble flow T on the top surface of the piston 5.

Figure 3:
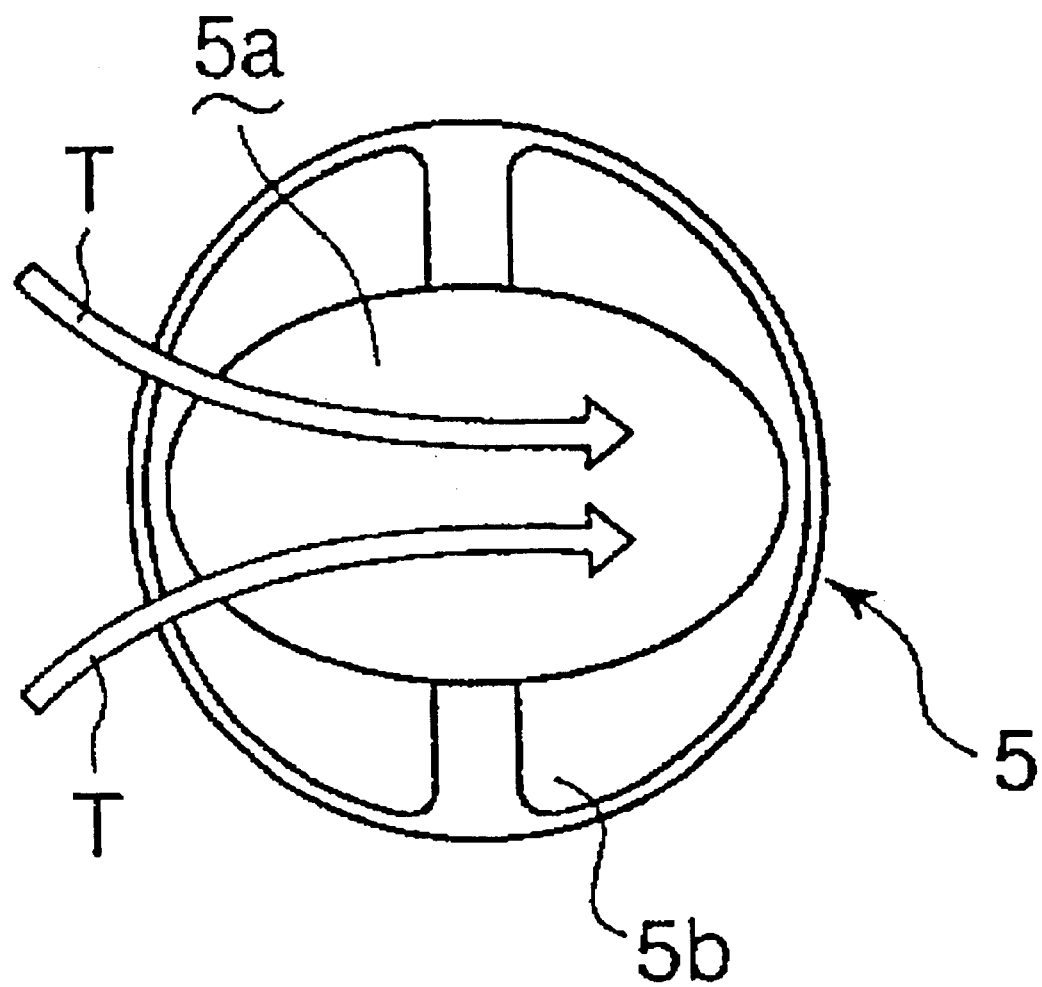
FIG. 3 is a plain view of the piston.

The top surface of the piston 5 is formed with a cavity 5a. In a cross-sectional view as illustrated in FIG. 2, the cavity 5a spans symmetrically for the cylinder axis, and its bottom surface is formed into a smooth curvature. In a plan view as illustrated in FIG. 3, the peripheral ridge of the cavity 5a is generally oval in shape, with a major axis oriented along the direction of the fuel injection by the fuel injector 18 (or the orientation of the center axis of the fuel spray, i.e., the horizontal direction in FIG. 3), and with a minor axis perpendicular to the major axis. The tumble flow T and the fuel spray are introduced into the cavity 5a from the opposite direction to each other, so that the fuel spray and the tumble flow T confront each other within the cavity 5a.

A perimeter 5b outside of the cavity 5a on the top surface of the piston 5 has a profile in parallel with and corresponding to the slant faces of the roof of the combustion chamber 6. A gap between a perimeter 5b of the top surface of the piston 5 and the roof of the combustion chamber 6 is reduced by them during a term prior to a top-dead-center in the cylinder 2.

Referring again to FIG. 1, an intake-air passage 21 is connected to one side surface of the main body of the engine 1 and communicates with the intake port 10 for the corresponding cylinder. On the other hand, an exhaust-gas passage 22 is connected to the other side of the main body of the engine 1 and communicates with the exhaust port 11 for the corresponding cylinder.

The intake-air passage 21 delivers intake air filtered through an air cleaner (not illustrated) into the combustion chamber 6 of the corresponding cylinder 2 of the main body 1. From the upstream side of an airflow, an air-flow sensor 23 for detecting the amount of intake air, an electric-controlled throttle valve 24 driven by an electric motor 25 to open and close the valve 24, and a surge tank 26 are disposed in the intake-air passage 21. The downstream side of the surge tank 26 of the intake-air passage 21 branches out into individual intake-air passages for each cylinder 2. Each individual passage is further separated into two passages at its end to communicate with the two intake ports 10, respectively.

In an upstream portion of each of the two intake ports 10, a tumble control valve 27 is provided for adjusting the velocity of the tumble flow in the combustion chamber 6. The tumble control valve 27 is operated to open and close by way of an actuator 28 such as a stepping motor. The tumble control valve 27 is a disciform butterfly valve formed with a notch that is formed at a lower portion of a rotational axis of the valve. When the tumble control valve 27 is fully closed, intake air passes through the notch so as to generate a strong tumble flow in the combustion chamber 6. The tumble flow becomes weaker gradually as the tumble control valve 27 is opened.

Shapes of the intake port 10 and the tumble control valve 27 are not limited to the ones described above. For example, the intake port 10 may be of a so-called common port type with one branch portion at which the passage is separated into respective ports. In this case, the tumble control valve 27 may be formed into a shape which corresponds to the cross-section of the common port and being partially notched.

On the other hand, the exhaust-gas passage 22 discharges combusted gas from the combustion chamber 6. At the upstream end of the exhaust-gas passage 22, an exhaust-gas manifold 22a is provided which communicates with the corresponding exhaust port 11 for each cylinder 2. In a collecting portion of the exhaust-gas manifold 22a, a linear $O_2$ sensor 30 is provided for detecting an oxygen concentration of the exhaust gas, and which generates a linear output for the oxygen concentration over the predetermined air/fuel ratio range including the stoichiometric air/fuel ratio. The oxygen concentration of the exhaust gas detected by the linear $O_2$ sensor 30 is used for determining the air/fuel ratio.

An exhaust-gas pipe 22b is connected to the collecting portion of the exhaust-gas manifold 22a at its upstream end, and is provided with a catalyst 31 for purifying the exhaust gas at its downstream portion.

The ignition circuit 17, the fuel injector 18, the fuel delivery system 20, the motor 25 for driving the throttle valve 24, and the actuator 28 for driving the tumble control valve 27 are each controlled by an engine control unit 40 (referred to as ECU hereinafter). The ECU 40 receives electronic signals from the crank angle sensor 9, the air-flow sensor 23, the linear $O_2$ sensor 30, an acceleration-pedal position sensor 36 for detecting the distance traveled by the acceleration pedal (or an operation amount of the acceleration pedal), a rotational speed sensor 37 for detecting the rotational speed of the engine, and a coolant-temperature sensor 38 for detecting the coolant temperature of the engine.

The ECU 40 functionally includes a temperature condition detection section 41, an operational condition detection section 42, a fuel-injection control section 43, and an ignition-timing control section 44. The temperature-condition detection section 41 estimates a temperature condition of the catalyst 31 based upon the coolant-temperature signal detected by the coolant-temperature sensor 38, and determines if the catalyst 31 is in an inactivated state whereby the catalyst temperature is lower than the activation temperature. It should be appreciated that the detection of the temperature condition of the catalyst 31 may be made in combination with the coolant temperature and a time period after starting of the engine for more accurate detection of the temperature condition of the catalyst 31. The reason is that, after the engine is started, the catalyst 31 firstly activates, then the coolant-temperature reaches the temperature showing that the engine reaches the warmed-up state after a certain period of time, because the catalyst 31 is smaller than the engine in specific heat capacity in general and is directly heated by the exhaust gas, so as to be heated more quickly than the engine. Alternatively, the catalyst temperature may be directly measured. In accordance with the invention, the term of "inactivated state" refers to the state where the catalyst 31 is not activated after engine start.

The operational condition detection section 42 determines or detects an engine operational-condition (or engine load and engine rotational speed) based upon the signals from the acceleration-pedal position sensor 36 and the rotational speed sensor 37.

Figure 4:
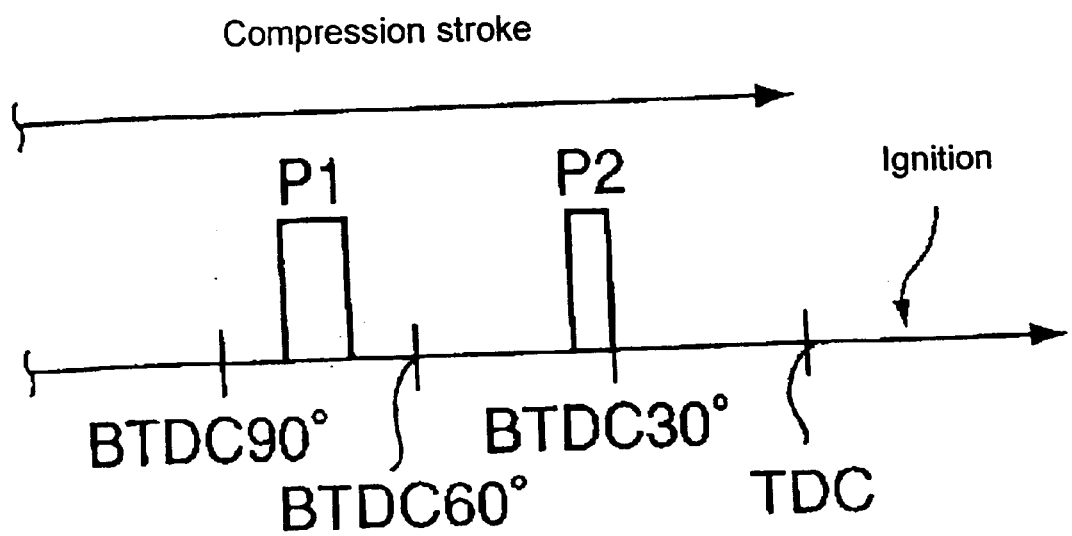
FIG. 4 is a timing chart illustrating the timing of the divided fuel injection in the catalyst inactivated state.

The fuel-injection control section 43 controls the injection modes (one-shot injection or divided injection), an injection timing, and the amount of fuel injection, under which the fuel injector 18 operates. Based upon the determination by the temperature-condition detection section 41, the fuel-injection control section 43 controls the fuel injector 18 to divide the fuel injection into at least a leading injection (P1) and a trailing injection (P2) during a compression-stroke prior to an ignition timing in the inactivated state of the catalyst 31, as illustrated in FIG. 4.

Then, the amount of the injected fuel is adjusted in cooperation with a control of the intake air amount so that the overall air/fuel ratio equals or approximates to the stoichiometric air/fuel ratio (from 13 to 17, for example) in the combustion chamber. Preferably, the air/fuel ratio may be set to lean of the stoichiometric air/fuel ratio for smoke reduction and HC emission in such a low temperature condition that the catalyst temperature is too low to expect any purification by the catalyst, thereafter it may be set to the stoichiometric air/fuel ratio for enhancing a warm-up effect when the catalyst temperature becomes near the activation temperature of the catalyst where the purification is expected, during the inactivated state of the catalyst.

In further detail, the fuel injection is controlled by the fuel-injection control section 43 as will be described hereinbelow in the inactivated state of the catalyst. The timing of the leading injection of the divided fuel injections is adjusted so that the fuel spray concentrates in the proximity of the spark plug as a result of redirection by the tumble flow. On the other hand, the timing of the trailing injection of the divided fuel injections is adjusted within a period during which the cylinder pressure increases though the tumble flow weakens in the late-stage of the compression stroke so that the fuel spray remains in the proximity of the spark plug by way of high pressure in the cylinder. As a result, fuel spray by the leading injection is distributed more broadly than fuel spray by the trailing injection, which provides a mixture layer by the trailing injection and a leaner mixture layer by the leading injection encompassing the layer by the trailing injection.

For this mixture distribution, the midpoint between the initiation timing of the leading injection (P1) and the initiation timing of the trailing injection (P2) is set within a period during the latter half of the compression stroke. Preferably, both the leading injection (P1) and the trailing injection (P2) are set to occur during the latter half of the compression stroke, or during the period between BTDC (or before top dead center 90°) and TDC (or top dead center) in a condition of low engine rotational-speed, low load and the catalyst being inactivated. Then, the timings of the leading injection (P1) and the trailing injection (P2) are set so that the midpoint of the completion timing of the leading injection (P1) and the initiation timing of the trailing injection (P2) is positioned within a period past two-thirds of the compression stroke (or after BTDC 60°). Particularly, the initiation timing of the leading injection is approximately BTDC 80° and the initiation timing of the trailing injection is approximately BTDC 35°. The ignition timing is set within the period ranging from ATDC (or after top dead center 15° to 20°) while the divided injection is being performed.

The timings of the leading injection and the trailing injection may be shifted in consideration of the operational condition. For instance, the injection timings may be advanced by a little amount in a condition of high load or high engine rotational-speed where the amount of the injected fuel is increased.

With regard to the proportion between the amount of the leading fuel injection and the trailing fuel injection, the amount of the leading fuel injection is preferably larger than that of the trailing injection. More preferably, the amount of the leading fuel injection is approximately twice as large as that of the trailing fuel injection.

Figure 5A:
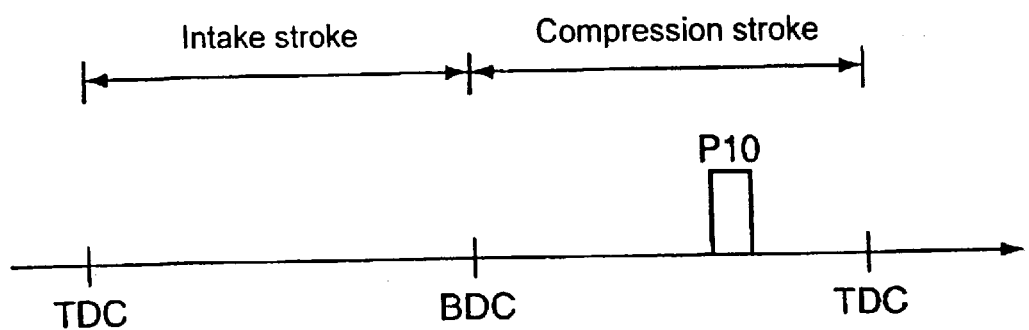
FIGS. 5(a) and (b) are timing charts illustrating the fuel injection timing in the stratified-combustion region and the fuel injection timing in the homogeneous-combustion region, respectively, in the catalyst activated state.
Figure 5B:
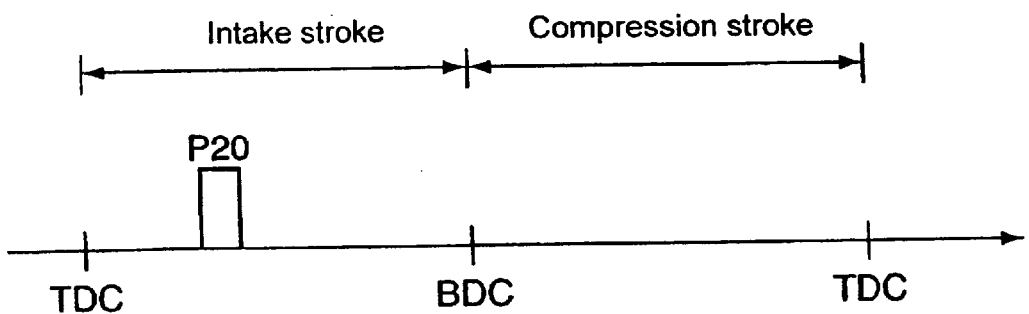

After the catalyst is warmed up to its activated state, the fuel injection mode is shifted between the stratified-combustion mode and the homogeneous-combustion mode according to the determination of the operational condition by the operational-condition detection section 42. Specifically, the region of lower load than a predetermined amount and lower engine rotational-speed lower than a predetermined amount is defined as a homogeneous region in which the engine operates on the homogeneous-combustion mode, and the region other than the homogeneous region is defined as a stratified region in which the engine operates on the stratified-combustion mode. In the stratified region, the overall air/fuel ratio is set to be significantly lean of the stoichiometric air/fuel ratio and the one-shot injection (P10) is performed during the compression stroke as illustrated in FIG. 5(*a*). In the homogeneous region, the overall air/fuel ratio is set to be relatively richer (the stoichiometric air/fuel ratio, for example) and the one-shot injection (P20) is performed during the intake stroke as illustrated in FIG. 5(*b*).

The ignition-timing control section 44 outputs control signals to adjust the ignition timing according to the engine operational condition. The ignition-timing control section 44 sets the ignition timing to the MBT in principle, and retards the ignition timing in the catalyst inactivated state. Specifically, in the catalyst inactivated state, it retards the ignition timing to a period after the top dead center (TDC) so as to ensure the ignitionability and combustibility of the mixture and promote the temperature rise in the exhaust gas, in relation to the divided fuel injection as described above.

In accordance with the embodiment described above, in the stratified-combustion region of a normal operational-condition after the catalyst activation, the amount of the intake-air charge and the injected fuel are controlled so that the air/fuel ratio is lean of the stoicniometric air/fuel ratio and the fuel injector 18 is controlled to inject fuel during the compression stroke. Thus, the engine operates on the stratified-combustion mode. In this case, the tumble flow is generated in the combustion chamber 6 and fuel is injected in the direction opposite to the tumble flow, so that the tumble flow and the fuel spray confront against each other in the combustion chamber 6. As a result, the fuel is promoted to atomize and the resulting combustible mixture is stratified in the proximity of the spark plug at the ignition timing. Particularly, by the adjustment of the strength of the tumble flow for balancing between the strength of the tumble flow and the penetration the fuel spray, the combustible mixture adequate in concentration is collected in the proximity of the spark plug at the ignition timing, thereby providing a proper stratified combustion.

On the other hand, in the homogeneous-combustion region, the amount of the intake-air charge and the injected fuel are controlled so that the air/fuel ratio is richer than that in the stratified-combustion region, for instance, the stoicniometric air/fuel ratio, and the fuel injector 18 is controlled to inject fuel during the intake stroke. As a result, the mixture evenly distributes in the combustion chamber and the engine operates on the homogeneous-combustion mode with such mixture distribution.

In the meantime, in the catalyst inactivated state, the divided injection is performed during the compression stroke to promote the light-off. Particularly, the timings of the leading fuel injection and the trailing fuel injection are optimized to provide an adequate mixture distribution by way of the tumble flow and the high cylinder-pressure during the late-stage of the compression stroke. This can avoid deterioration in emission performance while promoting the catalyst light-off. Such an effect will now be described in detail with reference to FIG. 6 to FIG. 10.

Figure 6:
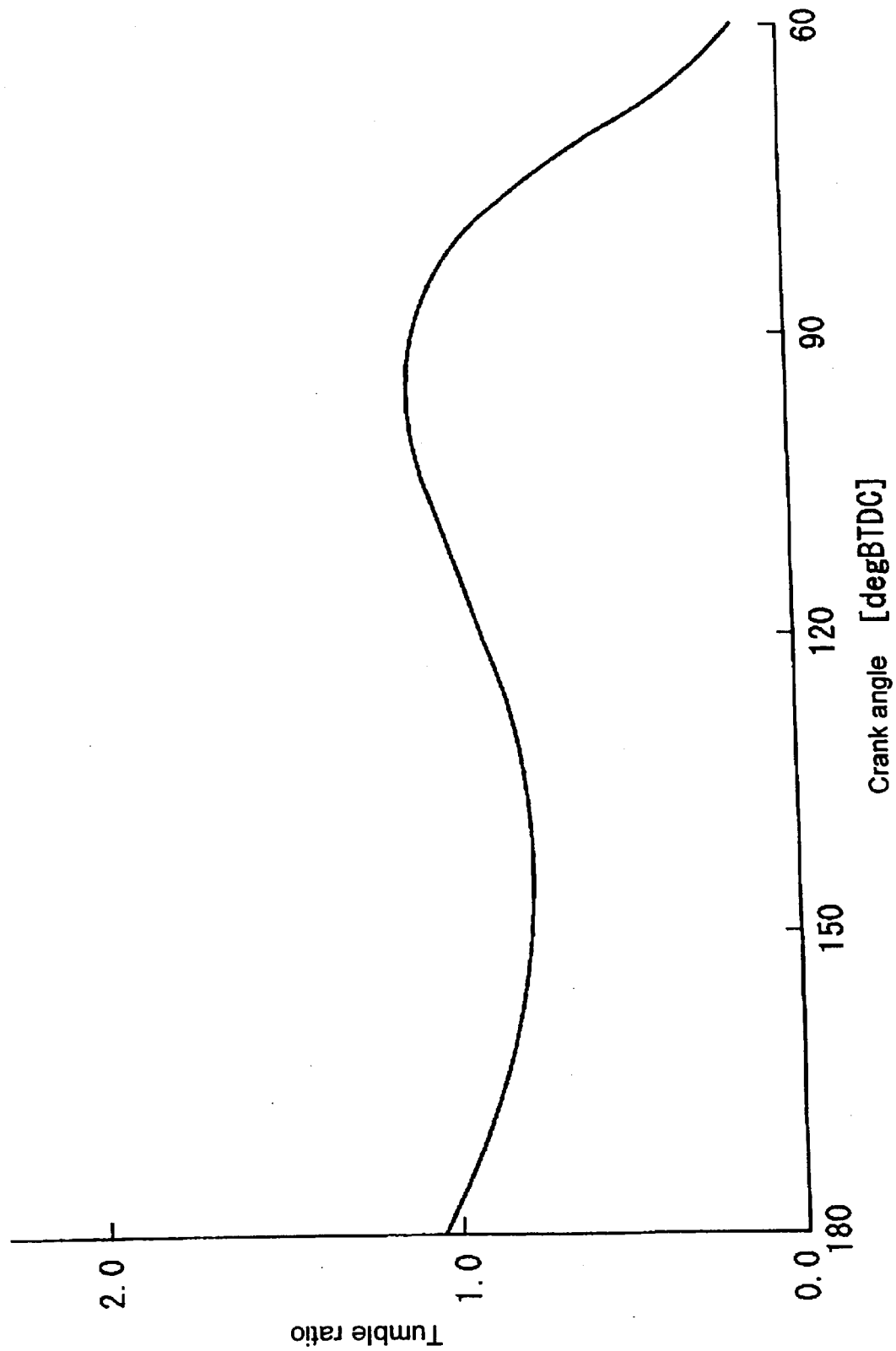
FIG. 6 is a graph chart illustrating the change in the tumble ratio during the compression stroke.

FIG. 6 illustrates a graph showing the change in a tumble ratio. As illustrated, the tumble ratio increases from the early-stage (approximately BTDC 150°) to the middle-stage (approximately BTDC 90°) in the compression stroke, but gradually decreases (or the tumble flow weakens) from the middle-stage to the late-stage in the compression stroke. The decrease in the tumble ratio results from the ascending piston which blocks the downward component of the tumble flow.

When the leading injection of the divided fuel injection is performed, the tumble flow remains strong, so that the fuel spray of the leading injection collides against the tumble flow to concentrate in the proximity of the spark plug at the ignition timing. When the trailing injection is performed, the tumble flow is so weak that the effect by the tumble flow is hardly expected. At this timing, however, the cylinder pressure is so high that the fuel spray of the trailing injection remains in the proximity of the spark plug.

Figure 7A:
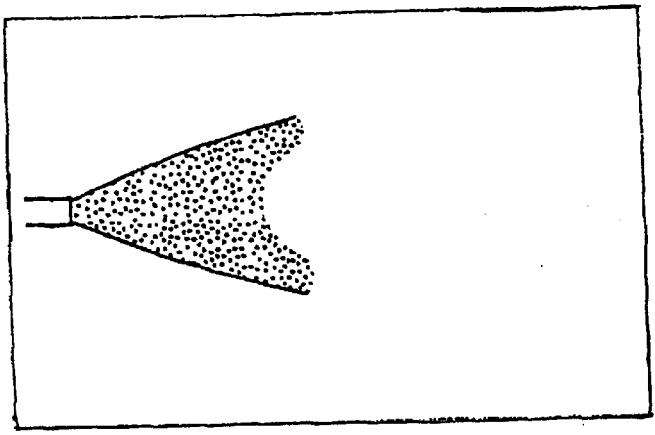
FIGS. 7(a), (b), and (c) are illustrations of fuel sprays by the fuel injector under the different barometric pressures, respectively.
Figure 7B:
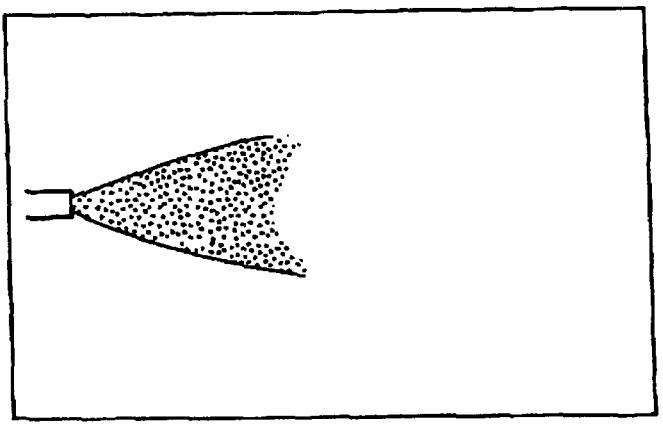
Figure 7C:
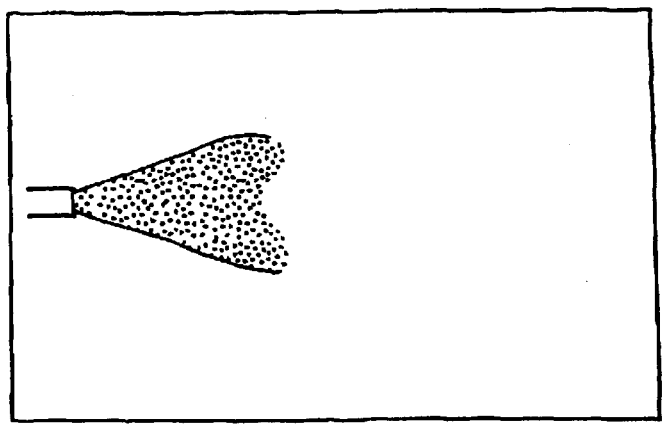

FIG. 7 illustrates diagrams showing the influence of the increasing cylinder pressure with the progress in the compression stroke on the fuel-spray distribution. These diagrams show profiles of the fuel spray a certain time-period after the fuel injection starts, under the condition of: (a) using a specified fuel injector 18, the barometric pressure at which injection bores of the injector 18 are positioned is 0.1 MPa equivalent to the atmosphere pressure; (b) using the specified fuel injector 18, the barometric pressure at which injection bores of the injector 18 are positioned is 0.25 MPa equivalent to the cylinder pressure approximately at BTDC (before top dead center 60°); and (c) using the specified fuel injector 18, the barometric pressure at which injection bores of the injector 18 are positioned is 0.4 MPa equivalent to the cylinder pressure approximately at BTDC 40°.

As illustrated, a fuel-spray travel is shortened by the increasing pressure resistance, as the piston approaches the top dead center to increase the cylinder pressure. Though the examples in the drawings show little change with respect to the increasing cylinder pressure, some fuel injectors provide the smaller spray angles for the higher cylinder pressure. In any cases, however, the diffusion of the fuel spray is suppressed and the velocity of the spray (or the fuel-spray travel for a certain time-period) is reduced, as the cylinder pressure increases.

Therefore, the trailing fuel injection is performed during the late-stage of the compression stroke being close to the top dead center, and a time-span between the fuel injection timing and the ignition timing is properly adjusted, so that the fuel spray is concentrated in the proximity of the spark plug by way of the high cylinder pressure during the late-stage of the compression stroke.

In this manner, at the ignition timing, the mixture of the fuel spray by the leading injection distributes over a certain area around the spark plug and a richer mixture-layer enriched by the fuel spray of the trailing injection concentrates in the proximity of the spark plug. Thus, the richer-mixture layer in the proximity of the spark plug combusts immediately after the ignition, the flame is propagated to the leaner mixture-layer thereafter, and then the leaner mixture-layer slowly combusts. Subsequently, excessive air originated from the leaner mixture-layer and remaining fuel originated from the richer mixture-layer mix with each other and combust. As a result, an overall combustion period is prolonged, or the combustion completion timing is delayed.

Additionally, the midpoint between the initiation timing of the leading injection and the initiation timing of the trailing injection is positioned within the term during the latter half of the compression stroke, more preferably, both the leading injection and the trailing injection are performed during the latter half of the compression stroke and the midpoint between the termination timing of the leading injection and the initiation timing of the trailing injection is positioned after BTDC 60°. That is, the timings of the leading injection and the trailing injection are retarded without deteriorating the combustion, so that the combustion completion timing is delayed in cooperation with the ignition retard to ATDC 15° to 20°.

The prolonged combustion increases the amount of energy imparted to the exhaust gas to significantly raise the exhaust-gas temperature. In comparison to the conventional apparatus in this kind, the present invention achieves further reduction in emission and more rapid increase in the exhaust-gas temperature for promoting the catalyst light-off.

The fuel of the leading injection rapidly atomizes because of its confronting against the tumble flow. In contrast, the fuel of the trailing injection tends to insufficiently atomize. To cope with this, by adjusting the amount of the leading fuel injection to be larger than that of the trailing fuel injection, the improved combustibility and the smoke reduction are beneficially achieved. Even with the less amount of the trailing fuel injection than that of the leading fuel injection as above, the fuel spray of the leading injection distributes around the spark plug and the fuel spray of the trailing injection concentrates in the proximity of the spark plug. As a result, the air/fuel ratio in the proximity of the spark plug still remains rich, thereby achieving a favorable mixture distribution to promote light-off.

Figure 8:
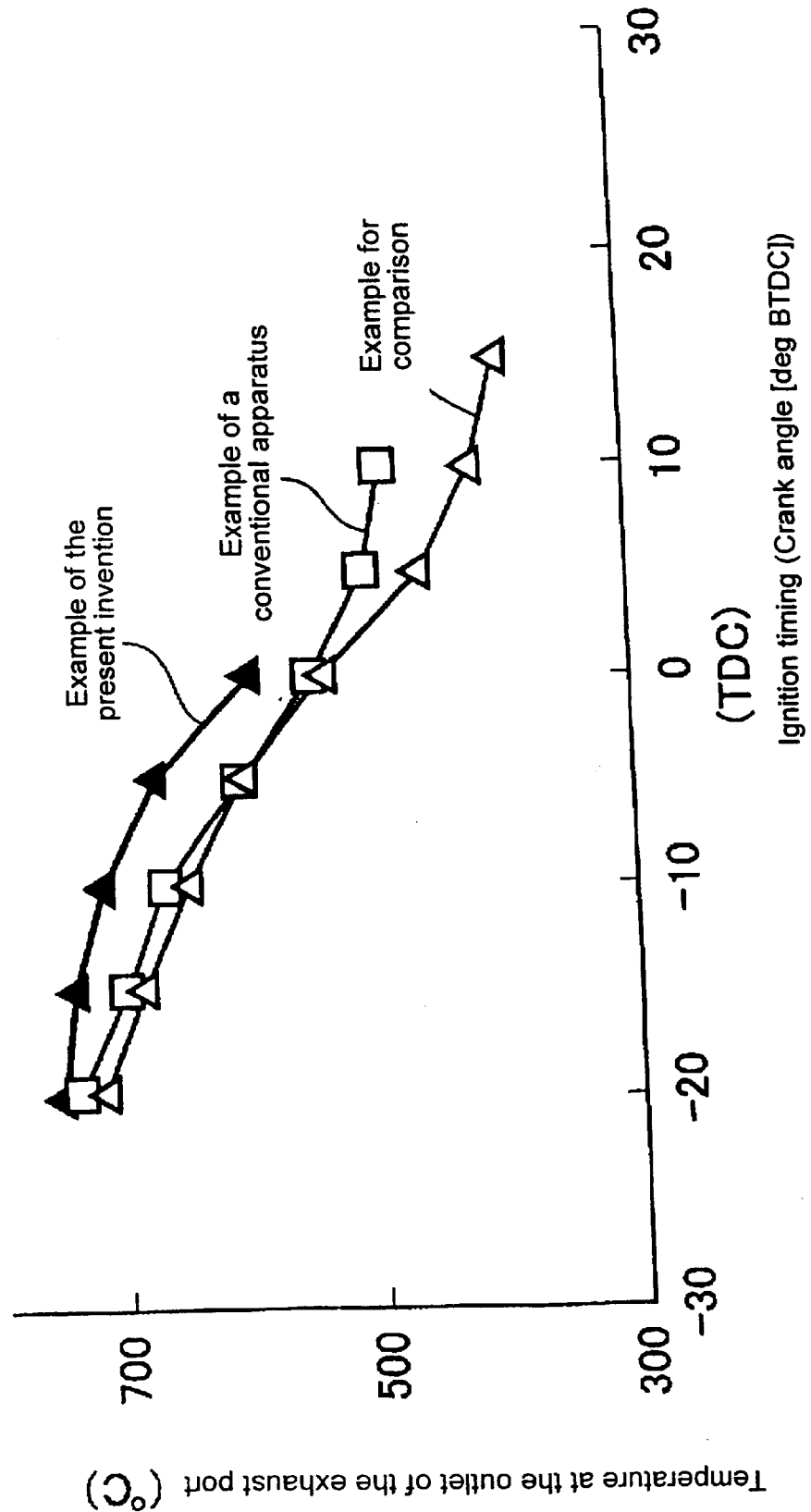
FIG. 8 is a graph chart illustrating the relationship between the ignition timing and the temperature at the outlet of the exhaust port, for the example of the present invention, the example for comparison, and the example of the conventional apparatus.
Figure 9:
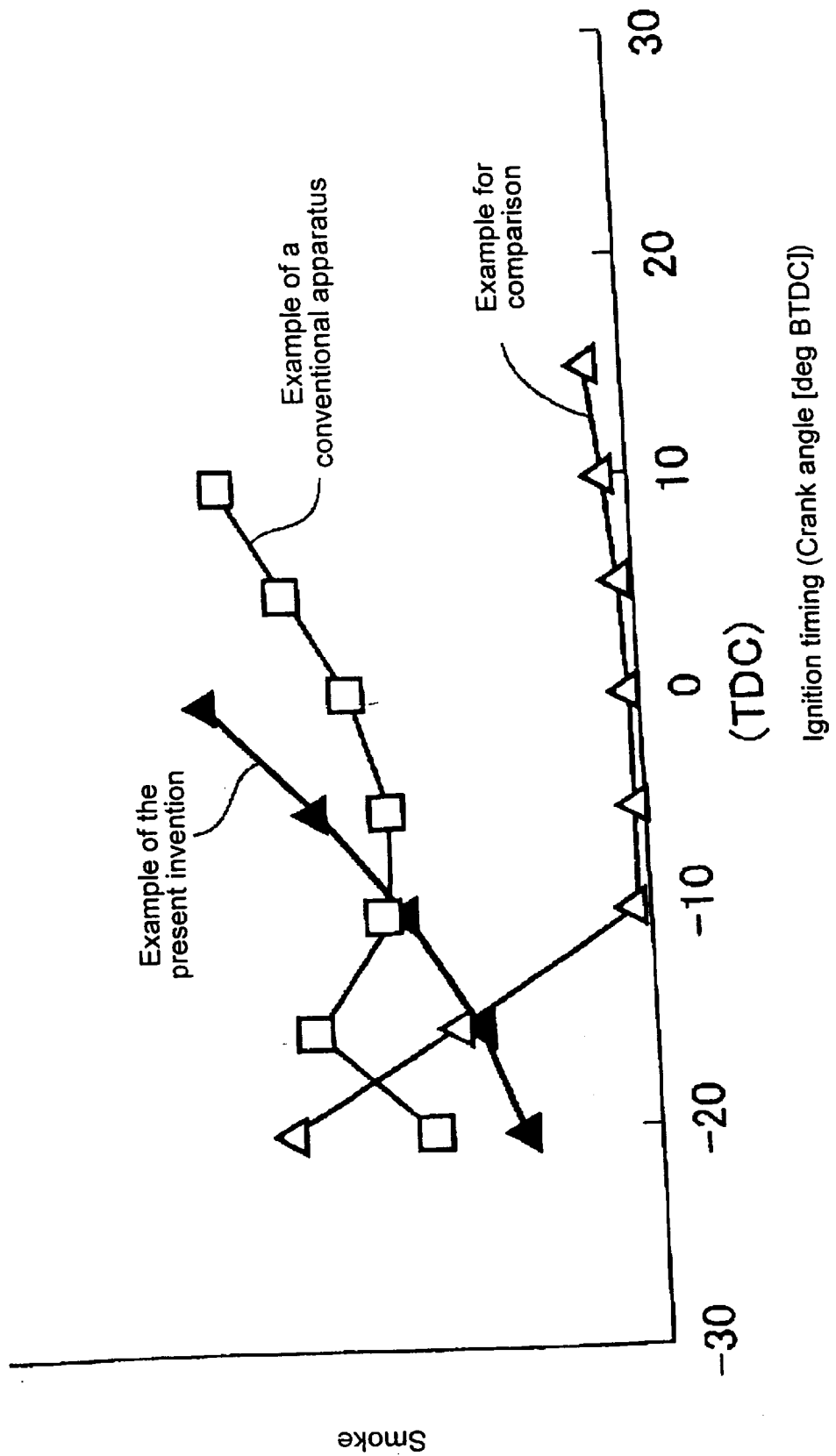
FIG. 9 is a graph chart illustrating the relationship between the ignition timing and the smoke production, for the example of the present invention, the example for comparison, and the example of the conventional apparatus.
Figure 10:
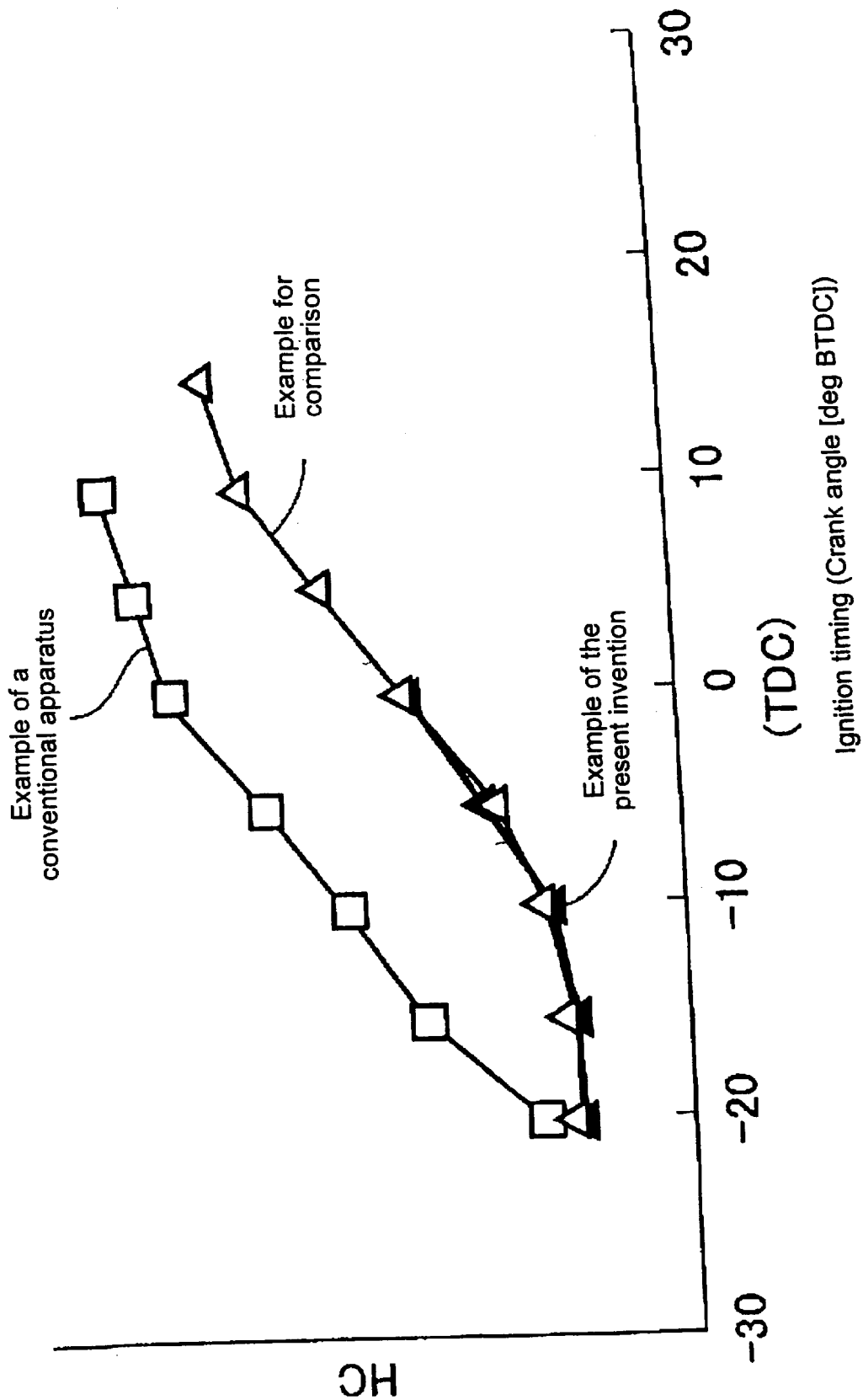
FIG. 10 is a graph chart illustrating the relationship between the ignition timing and the HC emission, for the example of the present invention, the example for comparison, and the example of the conventional apparatus.

Empirical data shown in FIG. 8 to FIG. 10 prove the effect described above. FIG. 8 to FIG. 10 illustrates graphs showing the change in the temperature at an outlet of the exhaust port, the amount of smoke generation, and the amount of HC emission, with respect to the ignition timing, respectively.

The example of the present invention uses an engine, in which the tumble flow and the fuel spray confront against each other as described above, two divided injections of a leading fuel injection starting at BTDC 80° and a trailing injection starting at BTDC 35° are performed during the compression stroke, and a ratio between the amount of the leading fuel injection and the amount of the trailing fuel injection is set to 2:1.

The example for comparison uses the same engine as that of the example of the present invention, in which two divided injections of a leading fuel injection during the intake stroke (or intake-stroke injection) starting at BTDC 15° and a trailing fuel injection during the compression stroke (or compression-stroke injection) starting at BTDC 60° are performed, and a ratio between the amount of the leading fuel injection and the amount of the trailing fuel injection is set to 1:1.

The reason why the trailing fuel injection starts at BTDC 60° is as follows. If the trailing fuel injection is delayed to the timing after BTDC 60°, though the fuel spray of the trailing injection is not dispersed because of the high cylinder pressure, the fuel spray of the leading injection (or intake-stroke injection) is dispersed over the combustion chamber, so that the proximate area to the spark plug and the area other than the proximate area are different from each other in fuel distribution condition, which may result in unstable combustion.

The reason for the ratio of 1:1 is that the relatively more amount of the leading fuel injection than that may cause the injected fuel to unduly disperse, which may deteriorate combustibility.

The example of a conventional apparatus uses an engine including a deep cavity on its piston which guides the fuel spray towards its spark plug by way of the wall surface of the cavity, in which two divided injections of a leading fuel injection during the intake stroke (or intake-stroke injection) starting at BTDC 315° and a trailing fuel injection during the compression stroke (or compression-stroke injection) starting at BTDC 70° are performed. As with the case of the examples above, if the trailing injection is delayed to the timing after that, combustibility deteriorates. Particularly, as the injection timing approaches the top dead center, fuel tends to deposit on the wall surface of the cavity, which may deteriorate combustibility.

As is apparent from FIG. 8, the ignition retard delays combustion, so as to raise the exhaust-gas temperature (or the temperature at the outlet of the exhaust port), which is advantageous to promote light-off. Such a tendency is common to the example of the present invention, the example for comparison, and the example of the conventional apparatus, but the example of the present invention provides the highest exhaust-gas temperature among them. This is achieved by the mixture distribution advantageous to rise in the exhaust-gas temperature, which results from the leading injection generating an adequate mixture distribution around the spark plug and the trailing injection generating a rich mixture-layer in the proximity of the spark plug by way of high cylinder pressure during the late-stage of the compression stroke.

As is apparent from FIG. 9, in the example of the present invention, the amount of smoke reduces for the later ignition timing approximately up to ATDC 20°. This is because the leading injection causes the fuel to be concentrated around the spark plug by way of the tumble flow remaining after the middle-stage of the compression-stroke and the timings of the leading injection and the trailing injection are delayed so that the fuel spray of the trailing injection is concentrated in the proximity of the spark plug by way of high cylinder pressure during the late-stage of the compression stroke, as a result, the preferable mixture distribution is attained for the delayed ignition timing up to ATDC 20°, which results in proper combustion.

In contrast, in the example for comparison, the ignition timing delayed to the timing after ATDC 10° deteriorates the mixture distribution to abruptly increase the smoke production, because the timing of the trailing fuel injection after BTDC 60° is unfavorable as described above. In the example of the conventional apparatus, part of the fuel of the trailing injection remains unburned in the form of fuel deposit on the wall surface of the cavity, which produces relatively more smoke.

For the ignition timing range from ATDC 15° to 20°, the example of the present invention produces less smoke than the example for comparison and the example of the conventional apparatus.

As is apparent from FIG. 10, the example of the conventional apparatus produces more HC emission than the example of the present invention and the example for comparison, because of the fuel deposit on the wall surface of the cavity. Therefore, in the example of the present invention, less smoke production, less HC emission, and higher exhaust-gas temperature for promoting the catalyst light-off are achieved in combination with retarding the ignition timing to the period ranging from ATDC 15° to 20°.

For the data shown in FIG. 8 to FIG. 10, the example of the conventional apparatus uses an engine including a deep cavity on its piston which guides the fuel spray towards its spark plug by way of the wall surface of the cavity, in which two divided injections of a leading fuel injection during the intake stroke and a trailing fuel injection during the compression stroke are performed. If both the divided injections are performed during the compression stroke in the same kind of engines, similar tendency to the example of the conventional apparatus above is seen. That is, the delay of the injection timing tends to result in the deterioration in the combustibility and the increase in smoke production and HC emission, because of the increase in the fuel deposit on the wall surface of the cavity.

As described above, the present invention is provided with the tumble generating section and the fuel injector which injects fuel in the direction opposite to the tumble flow into the combustion chamber, and controls the fuel injector to perform divided injections of the leading injection and the trailing injection during the compression stroke in the inactivated state of the catalyst. The trailing injection is performed at such a timing that its mixture concentrates in the proximity of the spark plug at the ignition timing by way of high cylinder pressure during the late-stage of the compression stroke. The leading injection is performed at such a timing that its mixture distributes around the mixture layer by the trailing injection at the ignition timing. The midpoint between the initiation timing of the leading injection and the initiation timing of the trailing injection is set within the term during the latter half of the compression stroke. Accordingly, the exhaust-gas temperature effectively rises while maintaining the preferable combustibility and avoiding the increase in smoke production and HC emission. Therefore, the further promotion of the catalyst light-off over the conventional apparatus in this kind is attained without deteriorating emission performance and fuel efficiency.

While particular embodiments of the present invention have been illustrated and described in relation to particular embodiments thereof, it will be obvious to those skilled in the art that many other variations and modifications and other uses will become apparent. It is preferred, therefore, that the present invention be limited not by the specific disclosure herein, but only by the appended claims.

What is claimed is:

1. A control apparatus for a direct-injection, spark-ignition engine including a tumble generating mechanism for generating a tumble flow in a combustion chamber, a fuel injector for injecting fuel into the combustion chamber in a direction opposite to the tumble flow so as to generate a combustible mixture adjacent to a spark plug at an ignition timing in association with the ignition timing in a predetermined operational region of low engine rotational-speed and low load, and a catalyst disposed in an exhaust-gas passage, said control apparatus comprising:

temperature-condition detection means for detecting a temperature condition of the catalyst; and control means for controlling a fuel-injection operation of the fuel injector, wherein said control means controls the fuel injector to perform divided fuel injections of at least a leading fuel injection and a trailing fuel injection during a compression stroke prior to the ignition timing based upon a detection of said temperature condition by said temperature-condition detection means in an inactivated state of the catalyst, said trailing fuel injection being performed at such a timing that its mixture concentrates adjacent to the spark plug at the ignition timing by way of high cylinder pressure during a late-stage of said compression stroke, said leading fuel injection being performed at such a timing that its mixture distributes around a mixture layer by said trailing fuel injection at the ignition timing, and a midpoint between an initiation timing of said leading fuel injection and an initiation timing of said trailing fuel injection being positioned within a period during a latter half of a compression stroke.

2. The control apparatus for a direct-injection, spark-ignition engine as defined in claim 1, wherein said leading fuel injection is performed at such a timing that its fuel spray contacts the tumble flow to concentrate adjacent to the spark plug.

3. The control apparatus for a direct-injection, spark-ignition engine as defined in claim 1, wherein an amount of said leading fuel injection is larger than that of said trailing fuel injection.

4. The control apparatus for a direct-injection spark-ignition engine as defined in claim 1, wherein the fuel injector performs said leading fuel injection and said trailing fuel injection during a latter half of said compression stroke prior to an ignition timing in an inactivated state of the catalyst at least in a condition of low engine rotational-speed and low load.

5. The control apparatus for a direct-injection spark-ignition engine as defined in claim 4, wherein both the timings of said leading fuel injection and said trailing fuel injection are set so that a midpoint between a completion timing of said leading fuel injection and an initiation timing of said trailing fuel injection is positioned within a period past two thirds of said compression stroke.

* * * * *